US012611788B1

(12) United States Patent
Wang

(10) Patent No.: US 12,611,788 B1
(45) Date of Patent: Apr. 28, 2026

(54) ELECTRIC HAIR TRIMMER WITH ILLUMINATION SYSTEM

(71) Applicant: NATURE LAB CORPORATION, Aurora, CO (US)

(72) Inventor: Wenxuan Wang, Shenzhen (CN)

(73) Assignee: NATURE LAB CORPORATION, Aurora, CO (US)

( * ) Notice: Subject to any disclaimer, the term of this patent is extended or adjusted under 35 U.S.C. 154(b) by 0 days.

(21) Appl. No.: 19/327,201

(22) Filed: Sep. 12, 2025

(30) Foreign Application Priority Data

Aug. 28, 2025 (CN) ......................... 202521843420.6

(51) Int. Cl.
*B26B 19/46* (2006.01)
*B26B 19/04* (2006.01)
*B26B 19/14* (2006.01)
*B26B 19/38* (2006.01)

(52) U.S. Cl.
CPC .............. *B26B 19/46* (2013.01); *B26B 19/04* (2013.01); *B26B 19/148* (2013.01); *B26B 19/386* (2013.01)

(58) Field of Classification Search
CPC ....... B26B 19/46; B26B 19/04; B26B 19/148; B26B 19/386
See application file for complete search history.

(56) References Cited

U.S. PATENT DOCUMENTS 5,970,616 A * 10/1999 Wahl ........................ B26B 19/20 30/216
2008/0250645 A1* 10/2008 Tringali .................. B26B 19/46 362/115
2019/0321994 A1* 10/2019 Jacobowitz ........... B26B 19/046
2025/0001634 A1* 1/2025 Laschinski .............. B26B 19/46

* cited by examiner

*Primary Examiner* — Tsion Tumebo
(74) *Attorney, Agent, or Firm* — HOWARD M COHN and Associates, LLC

(57) ABSTRACT

An electric hair trimmer with an illumination system includes a handle, a blade head, and the illumination system. A motor seat is disposed on an output end of the handle. A motor is disposed in the motor seat. The blade head is capable of being mounted on the motor seat of the handle. The illumination system is disposed on the handle and the blade head. The illumination system includes a light source and a light guide body. The light source is disposed in the motor seat. An output optical axis of the light source is substantially parallel to an output axis of the motor. The light guide body is disposed on the blade head. A light-receiving surface of the light guide body is corresponding to the output optical axis of the light source. A light-emitting surface of the light guide body faces a working area of the blade head.

20 Claims, 14 Drawing Sheets

ELECTRIC HAIR TRIMMER WITH ILLUMINATION SYSTEM

TECHNICAL FIELD

The present disclosure relates to a technical field of personal care tools, and in particular to an electric hair trimmer with an illumination system.

BACKGROUND

Electric hair trimmers (such as electric shavers, hair clippers, and nose hair trimmers) have become an indispensable personal care tool in daily life. To improve trimming accuracy, especially in low-light environments, many high-end or professional trimmers have integrated illumination functions.

Currently, there are two common designs for electric hair trimmers with integrated illumination functions: a first one is one-piece electric hair trimmers with an integrated illumination component, and a second one is split-piece electric hair trimmers with an integrated illumination component.

In the one-piece electric hair trimmers with the integrated illumination component, a light source and a light guide body thereof are integrated into a non-detachable blade head or a handle thereof. The one-piece electric hair trimmers have a relatively simple structure and good water and dust resistance, and the light source thereof and a light guide path thereof are easy to align and seal. However, the biggest disadvantage of the one-piece electric hair trimmers is that the blade head is not replaceable or is expensive to replace. When the blade head wears out and needs to be replaced, the integrated illumination component thereof (especially the light source) is discarded accordingly, resulting in waste. Alternatively, a user needs to buy an expensive replacement blade head that comprises the integrated illumination component, which increases use cost.

In the split-piece electric hair trimmers with the integrated illumination component, to meet a demand for a replaceable blade head, some split-piece electric hair trimmers incorporate the light source directly into a detachable blade head thereof, which allows the light source to be replaced with the detachable blade head. While the split-piece electric hair trimmers solve a problem that a conventional blade head is not replaceable, it also introduces new challenges.

Specifically, the split-piece electric hair trimmers have poor sealing performance. The detachable blade head is a working area that is frequently exposed to water, hair debris, and cleaning fluids. Placing the light source, which comprises circuitry and light-emitting components, in the detachable blade head places extremely high demands on the sealing of the light source. The light source must be waterproof, dustproof, and corrosion-resistant, significantly increasing design and manufacturing costs and significantly increasing reliability risks.

Furthermore, the split-piece electric hair trimmers have a complex structure. The detachable blade head must contain an independent light source (such as an LED) and tiny power/control circuitry (which may require contacts or wireless power), which significantly increase the complexity and manufacturing cost of the detachable blade head.

Moreover, the split-piece electric hair trimmers have low optical coupling efficiency. When installing the detachable blade head, it is crucial to ensure that power supply contacts of the light source on the detachable blade head are precisely and reliably in contact with contacts on the handle. Furthermore, a design of the light guide body must ensure that a relative position of the light source and the light guide body within the detachable blade head is precisely fixed, which requires high manufacturing and assembly precision, otherwise it may result in unstable lighting brightness or severe light loss.

Therefore, in the prior art, achieving effective, reliable, and economical lighting in electric hair trimmers with a detachable blade head faces a difficult trade-off between convenient blade head replacement and sealing reliability, durability, and cost of an illumination system (particularly the light source). How to place the light source in the handle that is safer, more stable, and less frequently replaced than the blade head and how to efficiently direct light to the working area of the blade head through a simple and reliable light transmission structure while ensuring convenient blade head replacement is an urgent improvement to be made.

SUMMARY

To solve defects in the prior art, the present disclosure provides an electric hair trimmer with an illumination system.

The electric hair trimmer not only ensures sealing and reliability of a light source thereof (especially waterproof and dustproof), but also meets a demand for detachable and replaceable blade head. Moreover, the electric hair trimmer well illuminate a working area during a trimming process.

The present disclosure provides an electric hair trimmer with an illumination system. The electric hair trimmer comprises a handle, a blade head, and the illumination system. A motor seat is disposed on an output end of the handle. A motor is disposed in the motor seat. The blade head is capable of being quickly mounted on the motor seat of the handle. The illumination system is disposed on the handle and the blade head. The illumination system comprises a light source and a light guide body. The light source is disposed in the motor seat. An output optical axis of the light source is substantially parallel to an output axis of the motor. The light guide body is disposed on the blade head. A light-receiving surface of the light guide body is corresponding to the output optical axis of the light source. A light-emitting surface of the light guide body faces a working area of the blade head.

In one embodiment, the light guide body extends upward from the light-receiving surface to the light-emitting surface along an inner side of a front surface of an outer wall of the blade head.

In one embodiment, a lens of the illumination system is mounted in the motor seat and is disposed on the light source. A top surface of the lens is substantially parallel to a top surface of the motor seat. Light emitted by the light source is concentrated by the lens and transmitted upward to the light-receiving surface of the light guide body.

In one embodiment, the output optical axis of the light source passes through a middle portion of the light-receiving surface of the light guide body. The light-receiving surface of the light guide body is symmetrically distributed with respect to the output optical axis of the light source to improve the efficiency of the light source in transmitting the light to the light guide body.

In one embodiment, the light-emitting surface of the light guide body extends laterally along the outer wall of the blade head to increase the irradiation width.

In one embodiment, the output shaft of the motor extends out from the motor seat A top end of the output shaft of the motor is higher than the top surface of the motor seat. The output shaft of the motor is configured to output a driving force of the motor upward to an input end of the blade head.

In one embodiment, an annular stepped groove is defined on an inner side of an upper edge of a peripheral wall of the motor seat. An annular stepped rim is disposed on an inner side of a lower edge of an outer wall of the blade head. When the upper edge of the peripheral wall of the motor seat is docked with the lower edge of the outer wall of the blade head, the annular stepped rim is clamped in the annular stepped groove, which increases a stability of the blade head mounted on the motor seat.

In one embodiment, the top surface of the motor seat is substantially perpendicular to the output shaft of the motor, an included angle formed between a top surface of the upper edge of the peripheral wall of the motor seat and the top surface of the motor seat is within 10-25 degrees, and an included angle formed between a top surface of the lower edge of the outer wall of the blade head and the top surface of the motor seat is within 10-25 degrees. In this way, a convenience of assembling and disassembling the blade head on the motor seat of the handle is increased.

In one embodiment, the output optical axis of the light source and an axis of the lens are located between an inner side of a front side of the peripheral wall of the motor seat and the motor.

In one embodiment, the blade head is a shaver head, the light guide body is a shaving light guide body, and an upper light-emitting surface of the shaving light guide body and a top surface of the outer wall of the shaver head are located on a same plane.

In one embodiment, in an extending direction from the light-receiving surface to the upper light-emitting surface of the shaving light guide body, cross-sectional areas of the shaving light guide body gradually increase. An area of the upper light-emitting surface of the shaving light guide body is about 1.5-4 times an area of the light-receiving surface of the shaving light guide body, which increases a horizontal width of the light.

In one embodiment, a notch is defined at a horizontal top end of the front surface of the outer wall of the shaver head. The shaving light guide body comprises a front light-emitting surface consistent with an outer surface of the outer wall of the shaver head. The front light-emitting surface of the shaving light guide body is close to an upper portion of the upper light-emitting surface of the shaving light guide body and extends outward along the notch, which plays a decorative role.

In one embodiment, the front light-emitting surface of the shaving light guide body is substantially perpendicular to the upper light-emitting surface of the shaving light guide body, which ensures that the front light-emitting surface of the shaving light guide body and the outer surface of the outer wall are smooth and consistent.

In one embodiment, the blade head is a hair clipper head, and the light guide body is a clipping light guide body. An upper middle portion of a front surface of the outer wall of the hair clipper head is recessed downward to form a U-shaped structure. An opening of the U-shaped structure faces upward to correspond to a trimming blade of the hair clipper head. The light-emitting surface of the clipping light guide body is substantially flush with an upper surface of a bottom wall of the U-shaped structure, and a width of the light-emitting surface of the clipping light guide body is slightly greater than half a width of the trimming blade.

In one embodiment, the light-emitting surface of the clipping light guide body is a concave arc-shaped surface. The light-emitting surface of the clipping light guide body is connected to the outer wall of the hair clipper head that is recessed inward, which ensures the smoothness of the outer wall of the hair clipper head.

In one embodiment, the blade head is a nose hair trimmer head, and the light guide body is a trimming light guide body. The nose hair trimmer head comprises a first trapezoidal cylindrical outer wall. An upper end of the first trapezoidal cylindrical outer wall of the nose hair trimmer head is narrowed radially to form a second trapezoidal cylindrical outer wall. A bottom portion of the second trapezoidal cylindrical outer wall is connected to the upper end of the first trapezoidal cylindrical outer wall of the nose hair trimmer head to form an annular step surface. The light-emitting surface of the trimming light guide body and the annular step surface of the nose hair trimmer head are located on a same plane.

In one embodiment, the light-receiving surface of the trimming light guide body is circular. A center of the light-receiving surface of the trimming light guide body is located on the output optical axis of the light source.

In one embodiment, the light-emitting surface of the trimming light guide body is in a kidney shape with a convex middle portion. A curvature of the light-emitting surface of the trimming light guide body is substantially consistent with a curvature of the annular step surface of the nose hair trimmer head.

In one embodiment, an upper portion of the trimming light guide body, close to the light-emitting surface of the trimming light guide body, defines a kidney-shaped positioning flange with a contour similar to the light-emitting surface. An upper end surface of the kidney-shaped positioning flange is in contact with a lower surface of the annular step surface of the nose hair trimmer head.

In one embodiment, a light channel is defined on a front side of the second trapezoidal cylindrical outer wall of the nose hair trimmer head. The light channel is inclined inward from the light-emitting surface of the trimming light guide body, and a top portion of the light channel is open.

The electric hair trimmer achieves reliable sealing and long-term protection for the light source. The light source is completely integrated and sealed in the motor seat on the handle. That is, the light source is physically isolated from a working area (the blade head) that is susceptible to contamination from moisture, hair debris, and cleaning fluids. Therefore, the light source is prevented from being exposed to moisture, dust, and cleaning fluids, thereby avoiding potentially damaging the light source. As a result, service life of the light source is extended, a failure rate of the light source is reduced, and a need for replacement of the light source with the blade head is eliminated.

The present disclosure reduces the cost and complexity of the blade head. The light guide body, configured as a purely optical component (no circuitry or light-emitting components), is integrated into the blade head that is detachable. The light source is fixedly mounted in the handle. The blade head retains only the light guide body that is low-cost and wear-resistant, eliminating a need to replace the light source or circuitry that is expensive when the blade head is replaced. Therefore, a structure of the blade head is simplified, the manufacturing cost of the blade head is reduced, and the use cost is reduced.

The present disclosure ensures efficient and stable light transmission. The output optical axis of the light source is parallel to the output shaft of the motor. The light-receiving surface of the light guide body is precisely aligned with the output optical axis of the light source, so that the light-emitting surface of the light guide body directly illuminates the working area. Light path alignment is automatically completed during installation of the blade head, leading to high coupling efficiency and stable illumination brightness, thus avoiding light path deviation or light loss caused by repeated assembly and disassembly of the blade head.

The present disclosure balances functional integration with ease of use. While illuminating the working area, the blade head and the handle of the electric hair trimmer are able to be quickly assembled and disassembled. The user is able to replace the blade head (for example, switching between different function heads or replacing a worn blade head with a new blade head) without disrupting the illumination function. The illumination system requires no additional operation and is allowed to be used after the blade head is assembled, thereby enhancing the user experience.

The present disclosure simplifies a power supply design. A circuit of the light source circuit is fully integrated in the handle, eliminating the need for separate power contacts or wiring for the blade head, thereby reducing circuit complexity and a risk of failure.

In the electric hair trimmer with the illumination system of the present disclosure, while ensuring that the blade head is easily replaced, efficient illumination of the working area is achieved by sealing and fixing the light source in the handle and integrating the light guide body into the blade head. Furthermore, the reliability of the light source is significantly improved and the cost of replacing the blade head is reduced. Moreover, the long-term stability of the illumination system is enhanced, and the expensive replacement costs of the blade head are avoided.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

Figure 1:
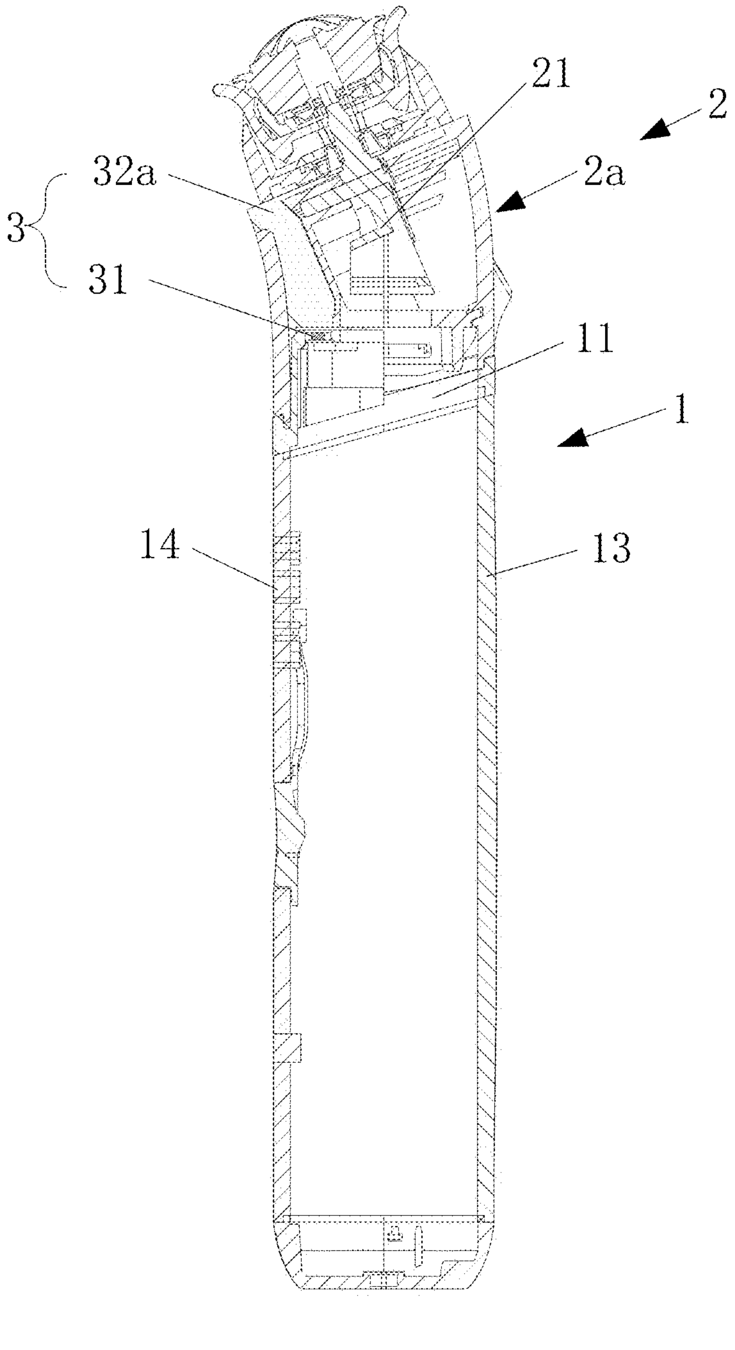
FIG. 1 is a cross-sectional schematic diagram of an electric hair trimmer according to a first embodiment of the present disclosure.
Figure 2:
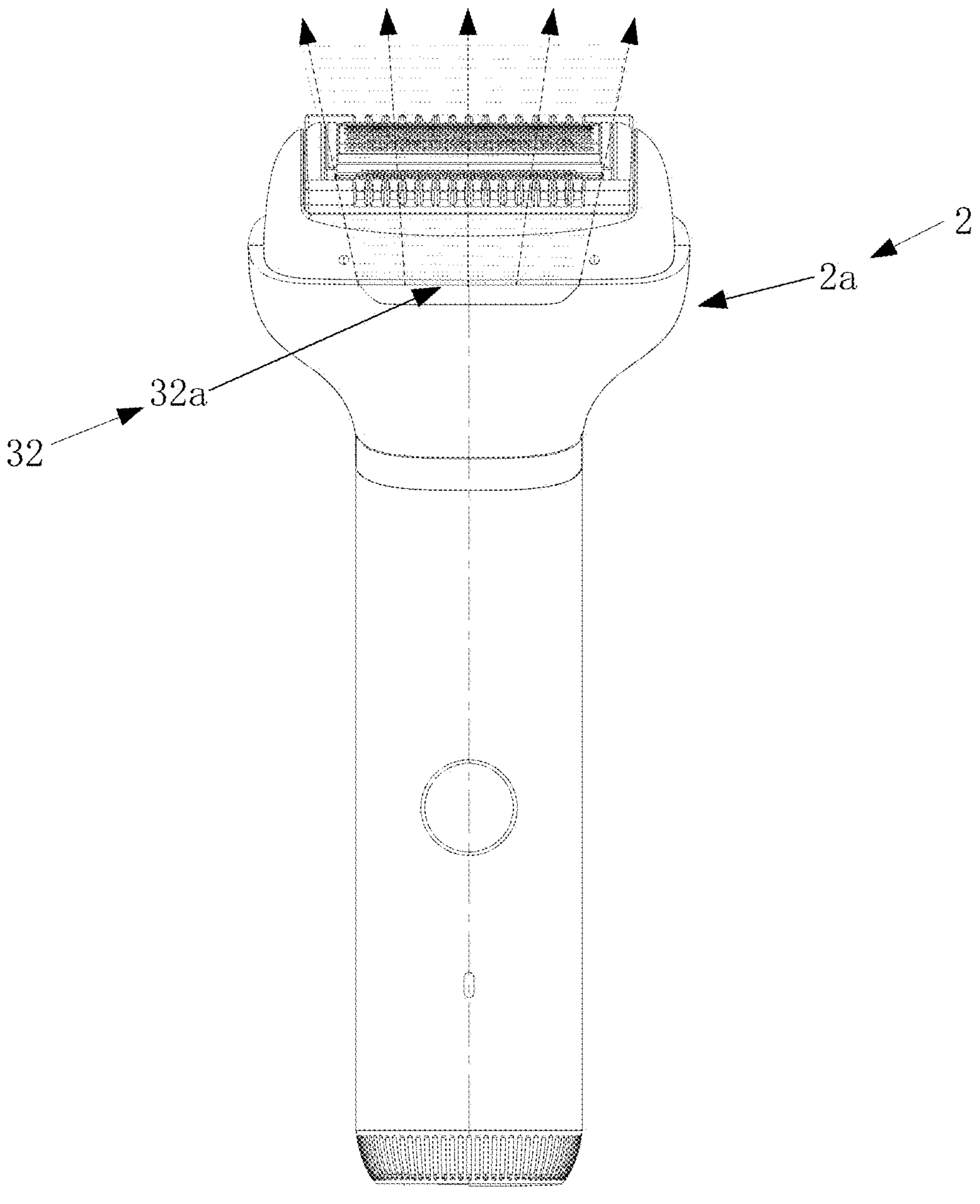
FIG. 2 is a schematic diagram of the electric hair trimmer according to the first embodiment of the present disclosure, where an illumination system thereof is in a sue state.

Handle—1; motor seat—11; peripheral wall—111; annular stepped groove—112; motor—12; output shaft—121; housing wall—13; control button 14; blade head—2; input end—21; outer wall—22; annular stepped rim—221; shaver head—2*a*; notch—222; hair clipper head—2*b*; bottom wall of the U-shaped structure—24; nose hair trimmer head—2*c*; first trapezoidal cylindrical outer wall—22*c*, second trapezoidal cylindrical outer wall—22*cl*; annular stepped surface—224; lighting channel—225; illumination system—3; light source—31; light guide body—32; light-receiving surface—321; light—emitting surface—322; lens—33; shaving light guide body—32*a*; light-receiving surface—321*a*; upper light—emitting surface—3221*a*; front light—emitting surface—3222*a*; clipping light guide body—32*b*; light-receiving surface—321*b*; light—emitting surface—322*b*; trimming light guide body—32*c*; light-receiving surface—321*c*; light—emitting surface—322*c*; kidney-shaped positioning flange—323*c*.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

As shown in FIGS. 1-8, the present disclosure provides an electric hair trimmer with an illumination system 3. The electric hair trimmer comprises a handle 1, a blade head 2, and the illumination system 3. A motor seat 11 is disposed on an output end of the handle 1. A motor 12 is disposed in the motor seat 11. The blade head 2 is capable of being quickly mounted on the motor seat 11 of the handle 1. The illumination system 3 is disposed on the handle 1 and the blade head 2.

The illumination system 3 comprises a light source 31 and a light guide body 32. The light source 31 is disposed in the motor seat 11. An output optical axis of the light source 31 is substantially parallel to an output axis of the motor 12.

The light guide body 32 is disposed on the blade head 2. A light-receiving surface 321 of the light guide body 32 is corresponding to the output optical axis of the light source 31. A light-emitting surface 322 of the light guide body 32 faces a working area of the blade head 2.

The light guide body 32 extends upward from the light-receiving surface 321 to the light-emitting surface 322 along an inner side of a front surface of an outer wall 22 of the blade head 2.

A lens 33 of the illumination system 3 is mounted in the motor seat 11 and is disposed on the light source 31. A top surface of the lens 33 is substantially parallel to a top surface of the motor seat 11. Light emitted by the light source 31 is concentrated by the lens 33 and is transmitted upward to the light-receiving surface 321 of the light guide body 32.

The output optical axis of the light source 31 passes through a middle portion of the light-receiving surface 321 of the light guide body 32. The light-receiving surface 321 of the light guide body 32 is symmetrically distributed with respect to the output optical axis of the light source 31 to improve the efficiency of the light source 31 in transmitting the light to the light guide body 32.

The light-emitting surface 322 of the light guide body 32 extends laterally along the outer wall of the blade head 2 to increase the irradiation width.

The motor 12 is mounted in the motor seat 11. The output shaft 121 of the motor 12 extends out from the motor seat 11 A top end of the output shaft of the motor 12 is higher than the top surface of the motor seat 11. The output shaft 121 of the motor 12 is configured to output a driving force of the motor 12 upward to an input end of the blade head 2.

An annular stepped groove 112 is defined on an inner side of an upper edge of a peripheral wall 111 of the motor seat 11. An annular stepped rim 221 is disposed on an inner side of a lower edge of an outer wall 22 of the blade head 2. A depth of the annular stepped groove 112 relative to the upper edge of the peripheral wall 111 of the motor seat 11 is greater than a height of the annular stepped rim 221 relative to the lower edge of the outer wall 22 of the blade head 2. When the upper edge of the peripheral wall 111 of the motor seat 11 is docked with the lower edge of the outer wall 22 of the blade head 2, the annular stepped rim 221 is clamped in the annular stepped groove 112, which increases a stability of the blade head 2 mounted on the motor seat 11.

The top surface of the motor seat 11 is substantially perpendicular to the output shaft 121 of the motor 12. An included angle formed between a top surface of the upper edge of the peripheral wall 111 of the motor seat 11 and the top surface of the motor seat 11 is within 10-25 degrees, and an included angle formed between a top surface of the lower edge of the outer wall 22 of the blade head 2 and the top surface of the motor seat 11 is within 10-25 degrees. In this way, a convenience of assembling and disassembling the blade head 2 on the motor seat 11 of the handle 1 is increased.

The output optical axis of the light source 31 and an axis of the lens 33 are located between an inner side of a front side of the peripheral wall 111 of the motor seat 11 and the motor 12.

Embodiment 1

As shown in FIGS. 1-8, an electric hair trimmer with an illumination system 3 of the embodiment comprises a handle 1, a blade head 2, and the illumination system 3.

The motor seat 11 is mounted on an upper section of a housing wall 13 of the handle 1 and a motor 12 and a light source 31 are disposed in the motor seat 11.

Figure 5:
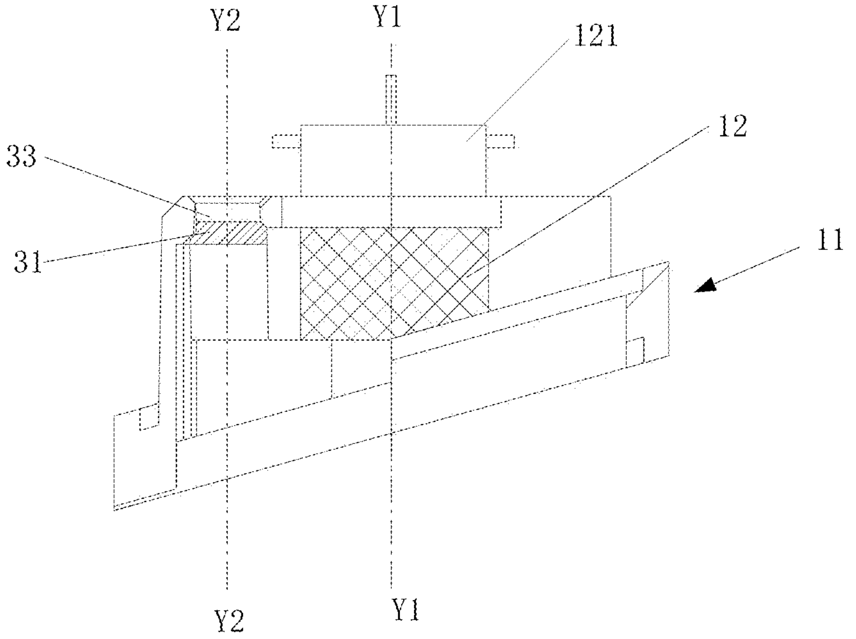
FIG. 5 is a schematic diagram of a motor seat, a motor, and a light source of the electric hair trimmer according to the first embodiment of the present disclosure.

An output optical axis Y2-Y2 of the light source 31 is substantially parallel to an output axis Y1-Y1 of the motor 12. The light source 31 is covered with a lens 33, and a top surface of the lens 33 is substantially flush with a top surface of the motor seat 11 (as shown in FIG. 5).

An annular stepped groove 112 is defined on an inner side of an upper edge of a peripheral wall 111 of the motor seat 11. An included angle formed between a top surface of the upper edge of the peripheral wall 111 of the motor seat 11 and the top surface of the motor seat 11 is within 10-25 degrees.

An operating key 14 is disposed on a front side of the housing wall 13 of the handle 1. The light source 31 and the lens 33 are disposed directly above the operating key 14.

The blade head 2 is a shaver head **2*a*. The shaver head 2*a* is clamped into the annular stepped groove 112 of the motor seat 11 through the annular stepped rim 221 at the lower edge of the outer wall 22*a* of the shaver head 2*a***, so as to realize quick disassembly and assembly.

The light guide body 32 is a shaving light guide body **32*a* disposed inside the shaver head 2*a*. The light-receiving surface 321*a* of the shaving light guide body 32*a* faces the lens 33 and receives the light emitted by the light source 31**.

Figure 6:
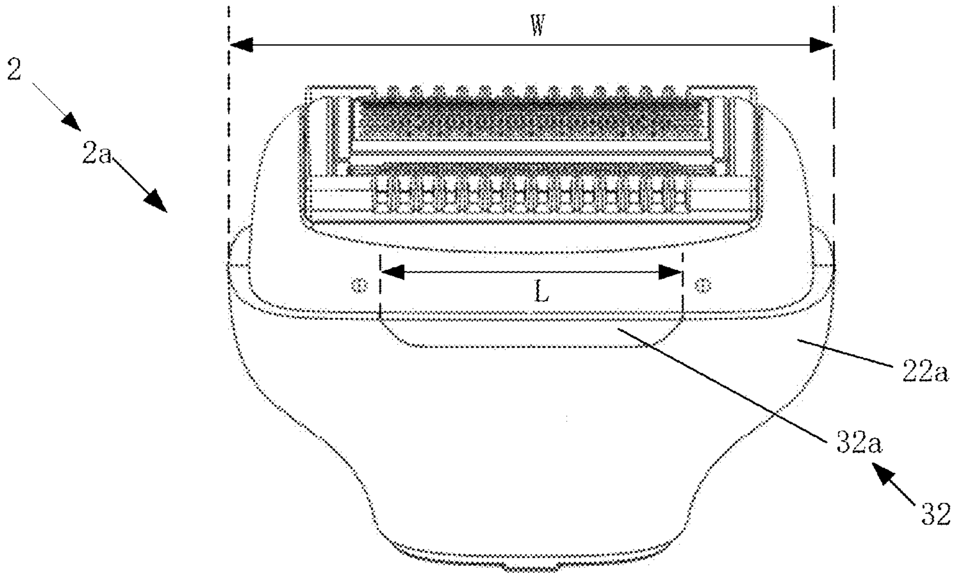
FIG. 6 is a schematic diagram of a shaver head of the electric hair trimmer according to the first embodiment of the present disclosure.
Figure 7:
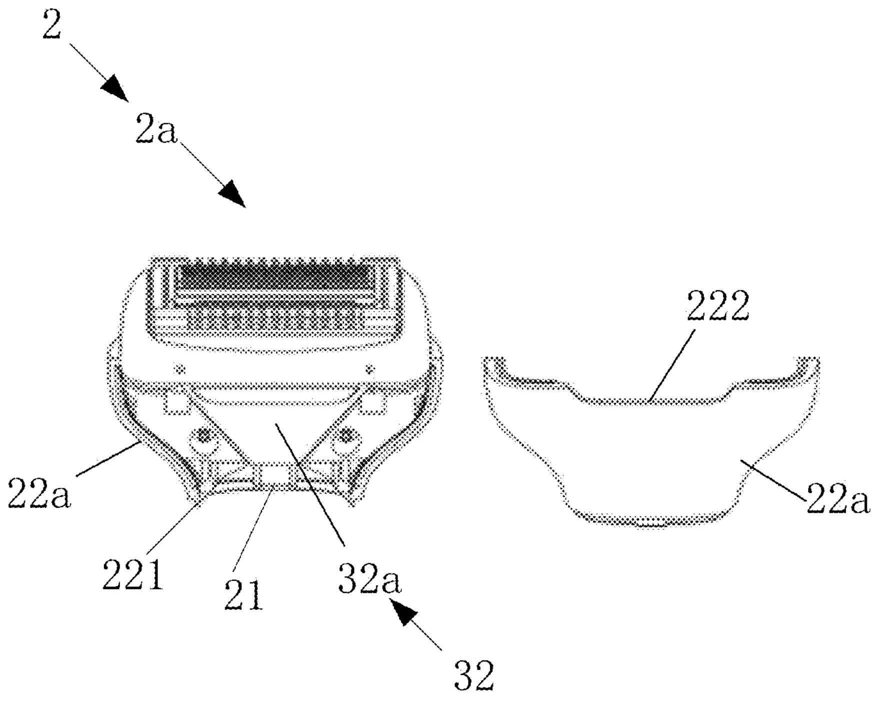
FIG. 7 is an exploded schematic diagram of the shaver head of the electric hair trimmer according to the first embodiment of the present disclosure.
Figure 8:
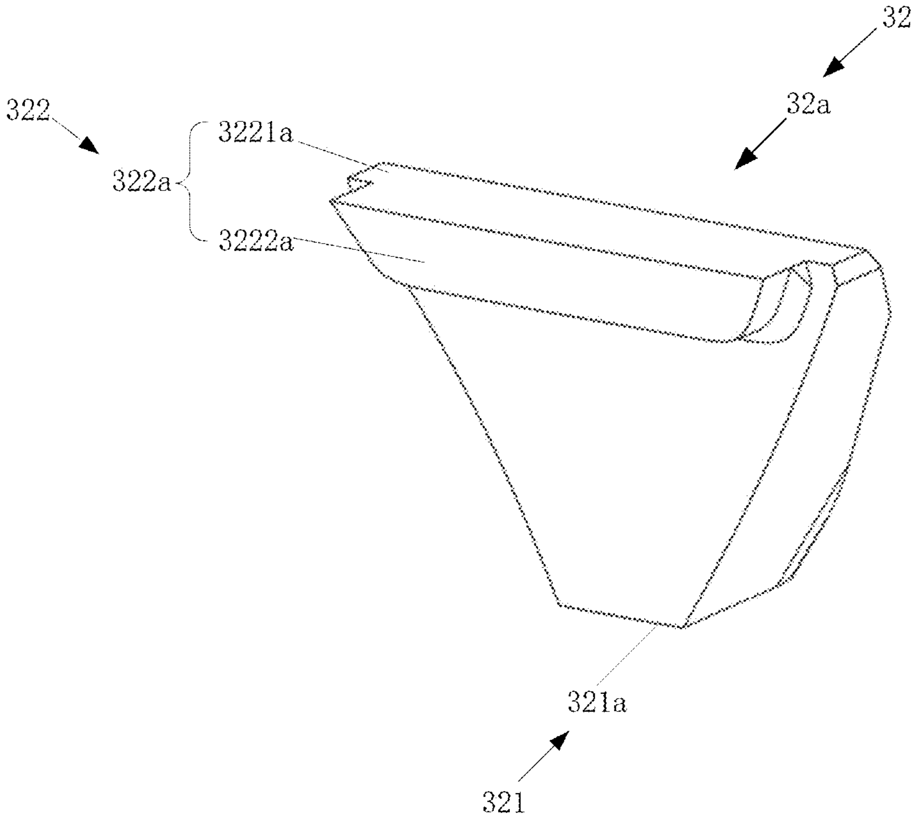
FIG. 8 is a schematic diagram of a shaving light guide body of the electric hair trimmer according to the first embodiment of the present disclosure.
Figure 9:
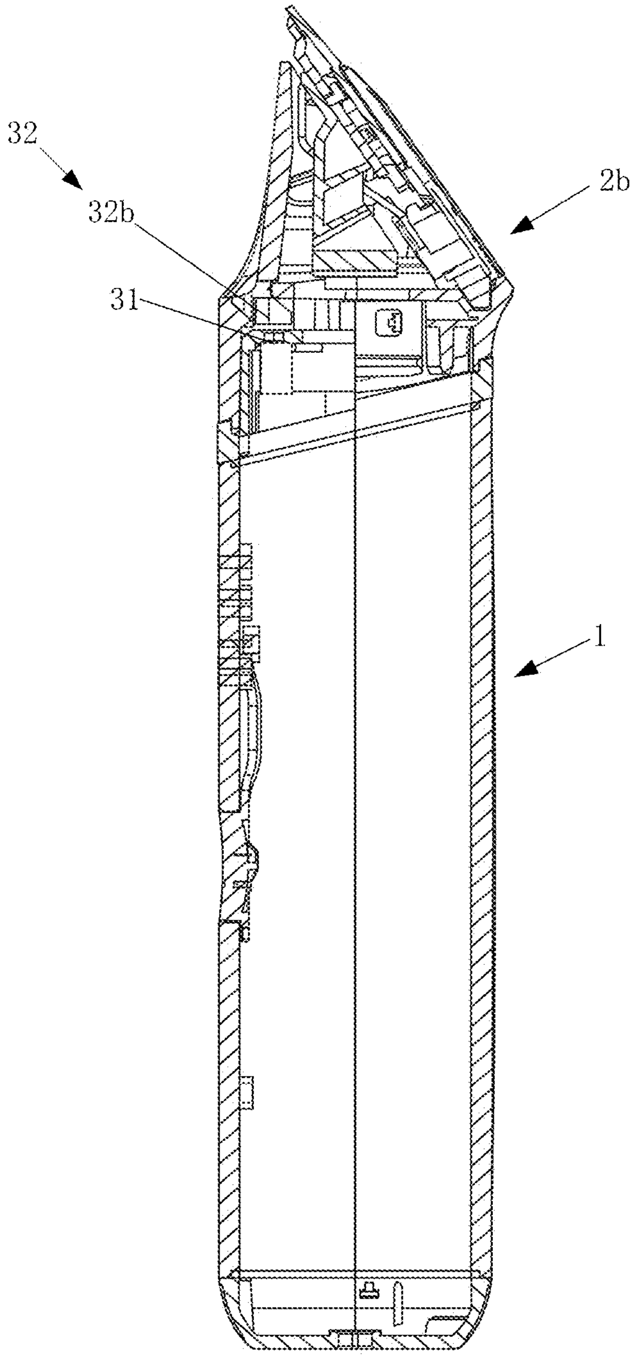
FIG. 9 is a schematic diagram of the electric hair trimmer according to a second embodiment of the present disclosure.
Figure 10:
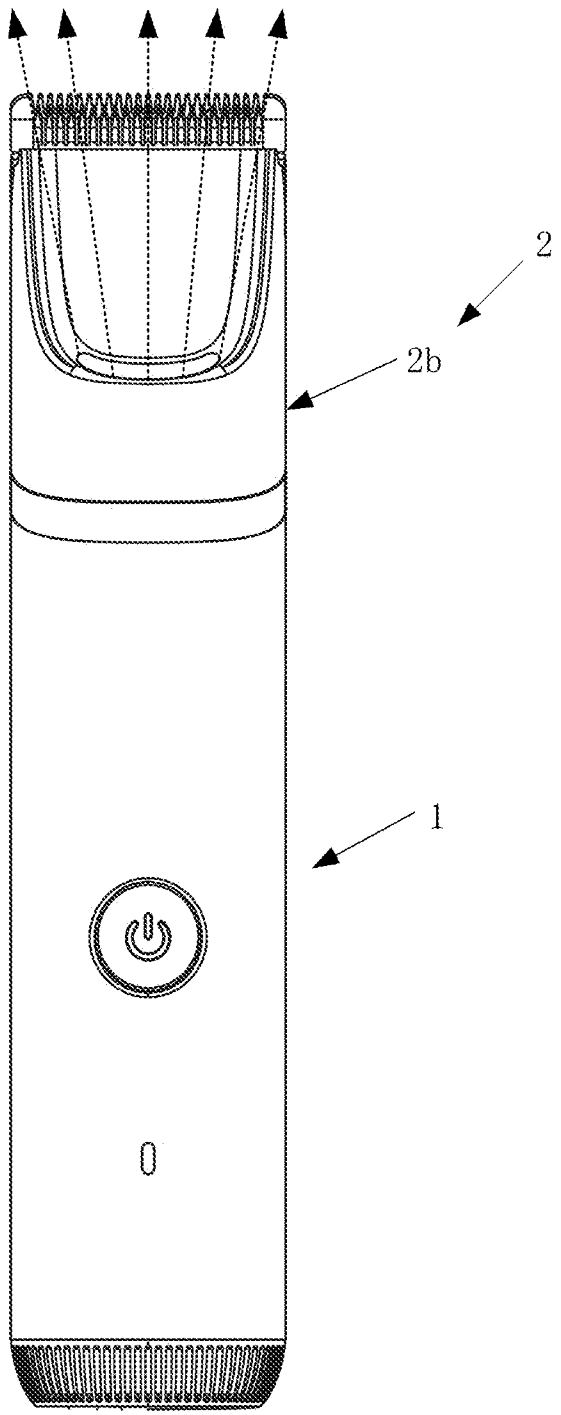
FIG. 10 is a schematic diagram of the electric hair trimmer according to the second embodiment of the present disclosure, where the illumination system thereof is in the sue state.
Figure 11:
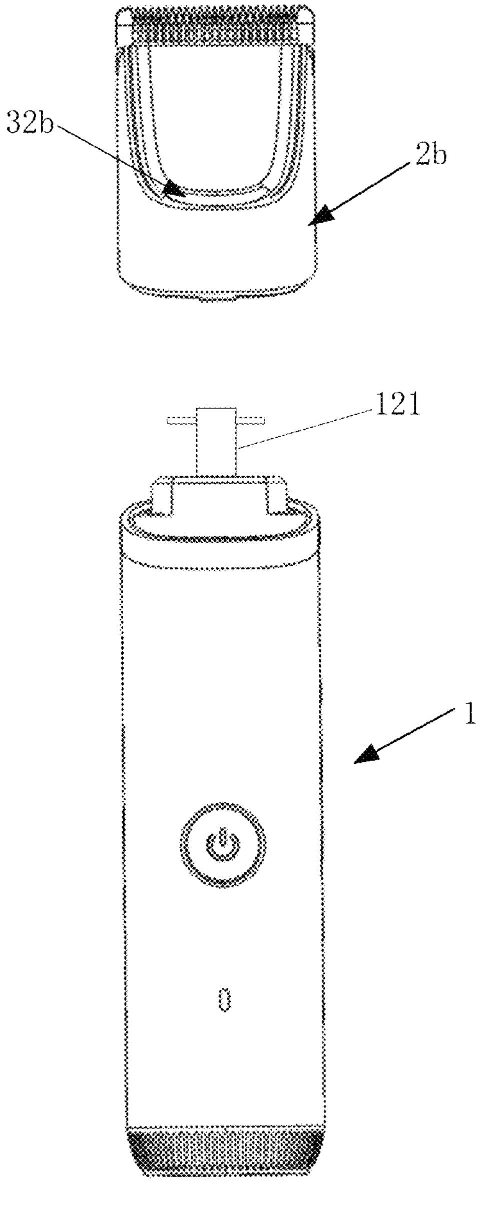
FIG. 11 is an exploded schematic diagram of the electric hair trimmer according to the second embodiment of the present disclosure.
Figure 12:
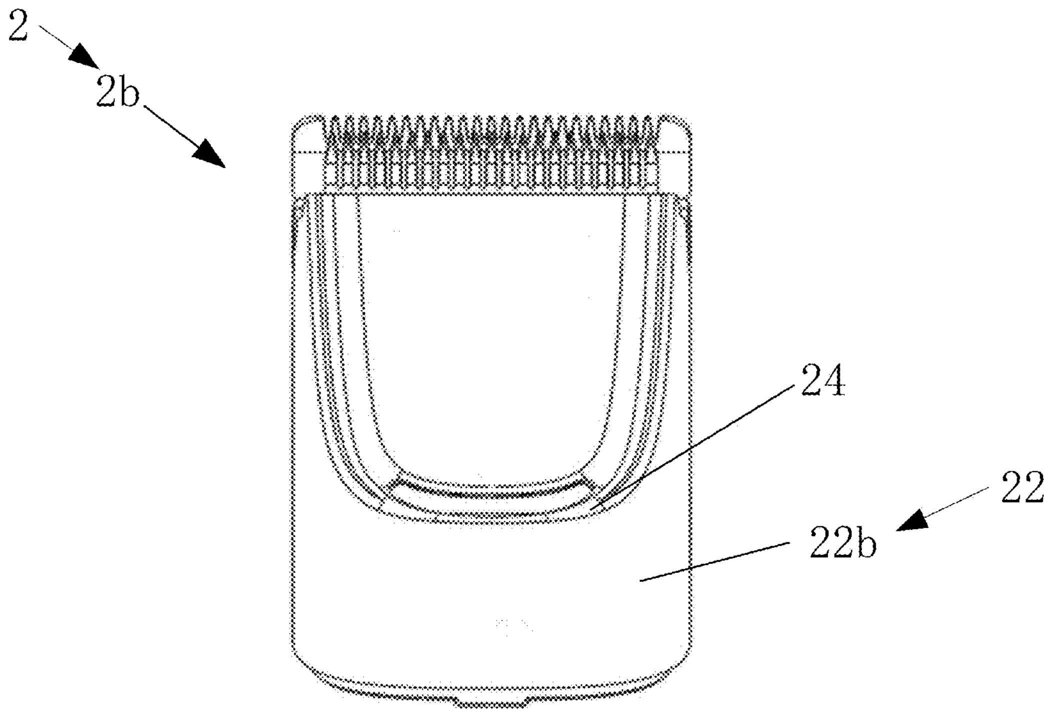
FIG. 12 is a schematic diagram of a hair clipper head of the electric hair trimmer according to the second embodiment of the present disclosure.
Figure 13:
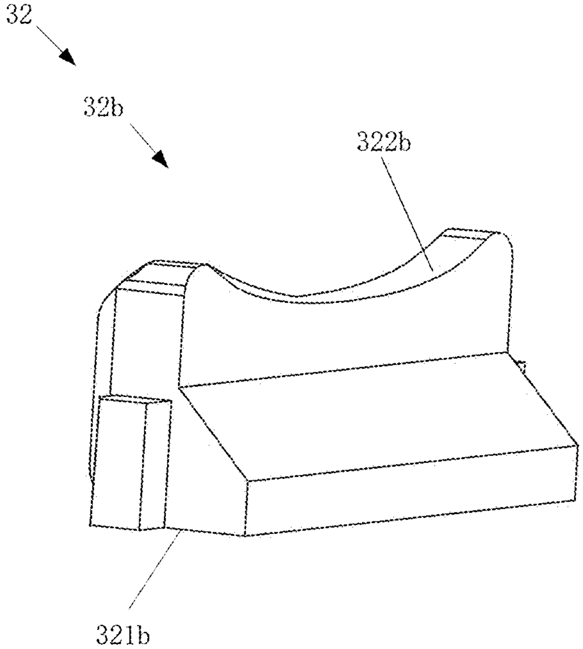
FIG. 13 is a schematic diagram of a clipping light guide body of the electric hair trimmer according to the second embodiment of the present disclosure.

As shown in FIGS. 6-8, an upper light-emitting surface **3221*a* of the shaving light guide body 32*a* is flush with a top surface of the outer wall 22*a* of the shaver head 2*a***.

The front light-emitting surface **3222*a* of the shaving light guide body 32*a* extends outward through the notch 222 222 on the front side of the outer wall 22*a* of the shaver head 2*a*, is perpendicular to the upper light-emitting surface 3221*a* of the shaving light guide body, and has a smooth outer surface. The shaving light guide body 32*a*** contains a light-scattering material to evenly diffuse the light to the working area.

The motor 12 is disposed on the output end of the handle 1. Specifically, the motor 12 is disposed in the motor seat 11 disposed on the output end of the handle 1. An output axis of the motor 12 is substantially parallel to an axis of the handle 1.

The motor seat 11 is mounted on the upper section of the housing wall 13 of the handle 1, and the motor 12 is mounted in the motor seat 11. A top end of the output shaft 121 of the motor 12 is higher than a top surface of the motor seat 11, so as to facilitate outputting the driving force of the motor 12 upward to an input end 21 of the shaver head **2*a***.

An annular stepped groove 112 is defined on an inner side of an upper edge of a peripheral wall 111 of the motor seat 11. An annular stepped rim 221 is disposed on an inner side of a lower edge of an outer wall 22 of the shaver head **2*a*. When the upper edge of the peripheral wall 111 of the motor seat 11 is docked with the lower edge of the outer wall 22 of the shaver head 2*a*, the annular stepped rim 221 is clamped in the annular stepped groove 112, which increases a stability of the shaver head 2*a* mounted on the motor seat 11**.

The top surface of the upper edge of the peripheral wall 111 of the motor seat 11 and the top surface of the lower edge of the outer wall **22*a* of the shaver head 2*a* are lower than the top surface of the motor seat 11, which facilitates cleaning of the motor seat 11**.

The top surface of the motor seat 11 is substantially perpendicular to the output shaft 121 of the motor 12. An included angle formed between a top surface of the upper edge of the peripheral wall 111 of the motor seat 11 and the top surface of the motor seat 11 is within 10-25 degrees, such as 15 degrees. An included angle formed between a top surface of the lower edge of the outer wall 22 of the blade head 2 and the top surface of the motor seat 11 is within 10-25 degrees, such as 15 degrees. In this way, the convenience of assembling and disassembling the shaver head 2*a* on the motor seat 11 of the handle 1 is increased.

A bottom surface of the lower edge of the peripheral wall 111 of the motor seat 11 is configured to connect with a top surface of the upper section of the housing wall 13 of the handle 1 and is substantially parallel to the top surface of the upper edge of the peripheral wall 111 of the motor seat 11.

Oblique decorative rings each with a lower front side and a higher rear side are respectively formed at the upper edge and the lower edge of the peripheral wall 111 of the motor seat 11.

The operating key 14 is disposed on the front side of the housing wall 13 of the handle 1. The light source 31 and the lens 33 are disposed directly above and corresponding to the operating key 14.

The output shaft 121 of the motor 12 is an eccentric shaft. The output shaft 121 of the motor 12 is configured to convert the driving force of the motor 12 into a lateral left-right swinging force through the input end 21 of the shaver head 2*a*.

As shown in FIGS. 1-5, the illumination system 3 is disposed inside the handle 1 and the shaver head 2*a*. The illumination system 3 primarily consists of the light source 31, the shaving light guide body 32*a*, and the lens 33. The light source 31 is disposed in the motor seat 11 of the handle 1. The output optical axis Y2-Y2 of the light source 31 is substantially parallel to the output axis Y1-Y1 of the motor 12. The shaving light guide body 32*a* is disposed inside the shaver head 2*a*. The light-receiving surface 321*a* of the shaving light guide body 32*a* corresponds to the output optical axis Y2-Y2 of the light source 31. The light-emitting surface 322*a* of the shaving light guide body 32*a* faces the working area of the shaver head 2*a*.

Figure 3:
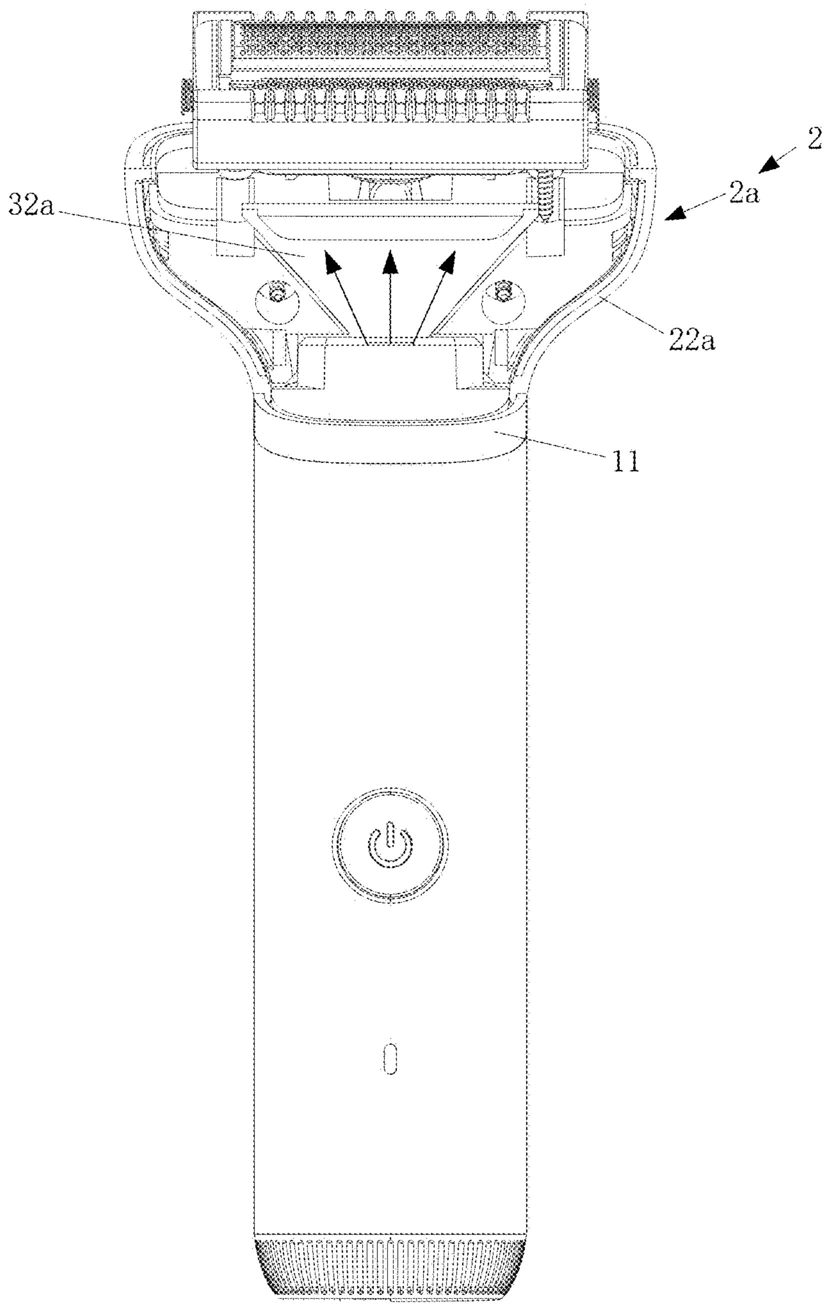
FIG. 3 is an exploded schematic diagram of the electric hair trimmer according to the first embodiment of the present disclosure.
Figure 4:
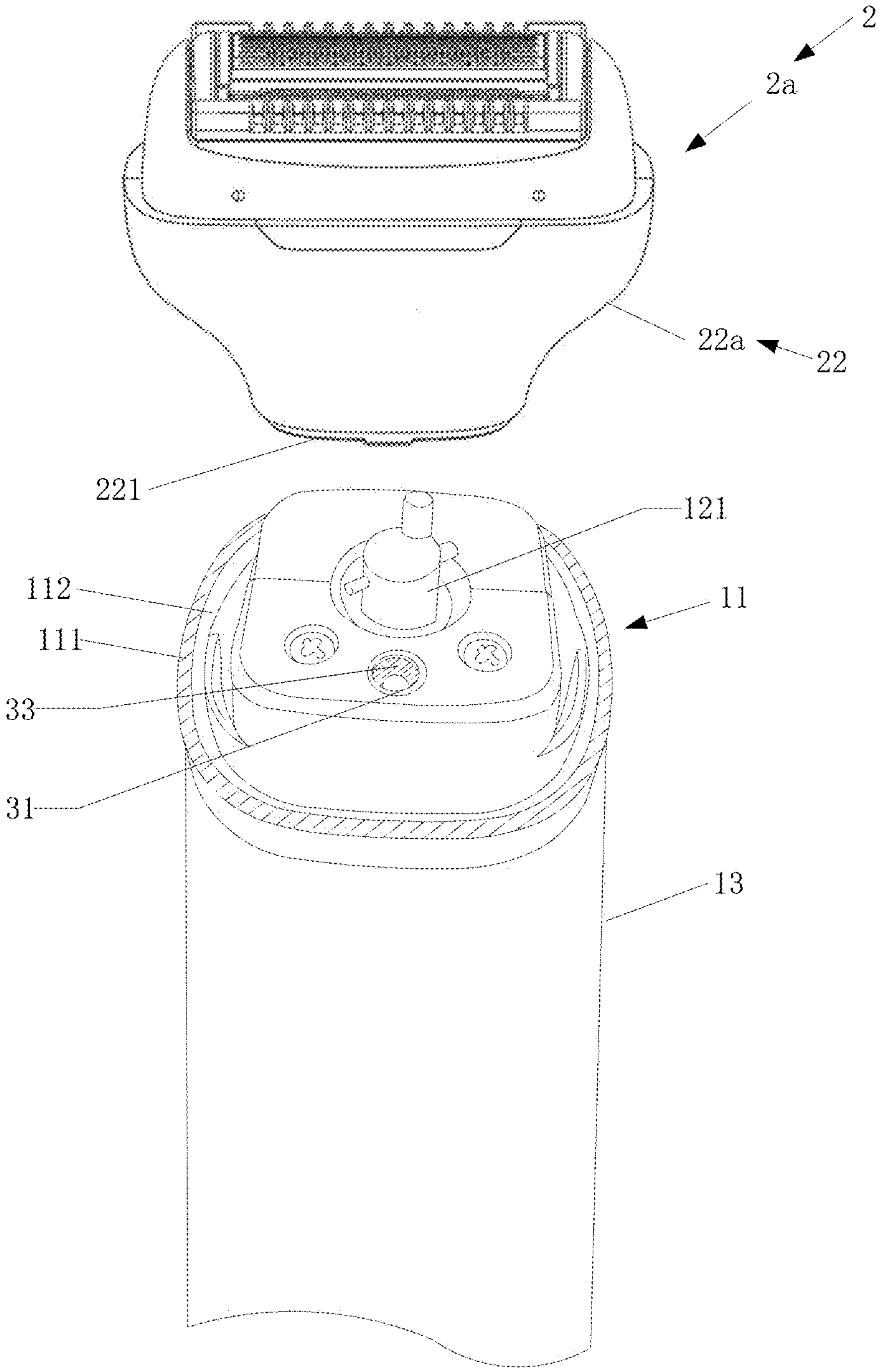
FIG. 4 is another exploded schematic diagram of the electric hair trimmer according to the first embodiment of the present disclosure.

As shown in FIGS. 3 and 4, the lens 33 of the illumination system 3 is mounted in the motor seat 11 and is disposed on the light source 31. The top surface of the lens 33 is substantially parallel to the top surface of the motor seat 11. The lens 33 is configured to concentrate the light emitted by the light source 31 and transmit the light upward to the light-receiving surface 321*a* of the shaving light guide body 32*a*.

The output optical axis Y2-Y2 of the light source 31 passes through a middle portion of the light-receiving surface 321*a* of the shaving light guide body 32*a*. The light-receiving surface 321*a* of the shaving light guide body 32*a* is symmetrically disposed relative to the output optical axis Y2-Y2 of the light source 31 to improve the efficiency of light transmission from the light source 31 to the shaving light guide body 32*a*.

As shown in FIGS. 2, 3, and 6-8, the light-emitting surface 322*a* of the shaving light guide body 32*a* extends laterally along the outer wall 22*a* of the shaver head 2*a* to increase the irradiation width.

The upper light-emitting surface 3221*a* of the shaving light guide body 32*a* is slender, and a length L of the upper light-emitting surface 3221*a* of the shaving light guide body 32*a* is approximately 20%-80% of a maximum width W of the shaver head 2*a*. Optionally, the length L of the upper light-emitting surface 3221*a* of the shaving light guide body 32*a* is 60% of the maximum width W of the shaver head 2*a*.

The shaving light guide body 32*a* extends upward from the light-receiving surface 321*a* to the upper light-emitting surface 3221*a* along the inner side of the front surface of the outer wall 22*a* of the shaver head 2*a*.

The shaving light guide body 32*a* contains a light-scattering material configured to evenly emit the light received from the light-receiving surface 321*a* of the shaving light guide body 32*a* through the upper light-emitting surface 3221*a* and the front light-emitting surface 3222*a* of the shaving light guide body 32*a*.

As shown in FIGS. 2, 3, 6, 7, and 8, the upper light-emitting surface 3221*a* of the shaving light guide body 32*a* is flush with the top surface of the outer wall 22*a* of the shaver head 2*a*.

In an extending direction from the light-receiving surface 321*a* to the upper light-emitting surface 3221*a* of the shaving light guide body 32*a*, cross-sectional areas of the shaving light guide body 32*a* gradually increase. An area of the upper light-emitting surface 3221*a* of the shaving light guide body 32*a* is about 1.5-4 times an area of the light-receiving surface 321 of the shaving light guide body 32*a*, which increases a horizontal width of the light.

In one embodiment, a notch 222 is defined at a horizontal top end of the front surface of the outer wall 22*a* of the shaver head 2*a*. The shaving light guide body 32*a* comprises the front light-emitting surface 3222*a* consistent with an outer surface of the outer wall 22*a* of the shaver head 2*a*. The front light-emitting surface 3222*a* of the shaving light guide body 32*a* is close to an upper portion of the upper light-emitting surface 3221*a* of the shaving light guide body 32*a* and extends outward along the notch 222, which plays a decorative role. The front light-emitting surface 3222*a* of the shaving light guide body 32*a* is substantially perpendicular to the upper light-emitting surface 3221*a* of the shaving light guide body 32*a*, which ensures that the front light-emitting surface 3222*a* of the shaving light guide body 32*a* and the outer surface of the outer wall 22*a* of the shaver head 2*a* are smooth and consistent.

During a working process, the motor 12 drives the output shaft 121, and the output shaft 121 drives the shaver head 2*a* to swing left and right. The light emitted by the light source 31 is concentrated by the lens 33 onto the light-receiving surface 321*a* of the shaving light guide body 32*a*. After being evenly distributed by the light-scattering material, the light is then emitted from the upper light-emitting surface 3221*a* of the shaving light guide body 32*a* to illuminate the working area of the shaver head. Simultaneously, the front light-emitting surface 3222*a* of the shaving light guide body 32*a* provides decorative frontal illumination.

Embodiment 2

As shown in FIGS. 9-13, the main difference between the embodiment 2 and the embodiment 1 is that the cutting head 2 is a hair clipper head 2*b*.

The light guide body 32 is a clipping light guide body 32*b*. A front surface of the outer wall 22*b* of the hair clipper head 2*b* is recessed downward to form a U-shaped structure. An opening of the U-shaped structure faces upward to correspond to a trimming blade of the hair clipper head 2*b*. The light-emitting surface 322 of the clipping light guide body 32*b* is substantially flush with an upper surface of a bottom wall 24 of the U-shaped structure. A width of the light-emitting surface 322 of the clipping light guide body 32*b* is slightly greater than half a width of the trimming blade. Most of the light emitted from the light-emitting surface 322*b* of the clipping light guide body 32*b* passes through a space surrounded by the U-shaped structure.

The light-emitting surface **322*b* of the clipping light guide body 32*b* is a concave arc-shaped surface. The light-emitting surface 322*b* of the clipping light guide body 32*b* is connected to the outer wall 22*b* of the hair clipper head 2*b* that is recessed inward, which ensures the smoothness of the outer wall 22*b* of the hair clipper head 2*b***.

The output shaft 121 of the motor 12 is a transverse pin shaft. The output shaft 121 is configured to transmit the driving force of the motor into a rotational force through an input claw-shaped shaft of the hair clipper head **2*b***.

During a working process, the light emitted from light source 31 passes through the lens 33 and enters the light-receiving surface **321*b* of the clipping light guide body 32*b*. The light then passes through the concave arc-shaped light-emitting surface 322*b* of the clipping light guide body 32*b* and passes through the opening of the U-shaped structure to illuminate the trimming blade. The motor 12** drives the hair clipper head via the transverse pin shaft, thereby achieving hair trimming. The light from the light source ultimately covers a trimming area of the hair clipper head.

Embodiment 3

Figure 14:
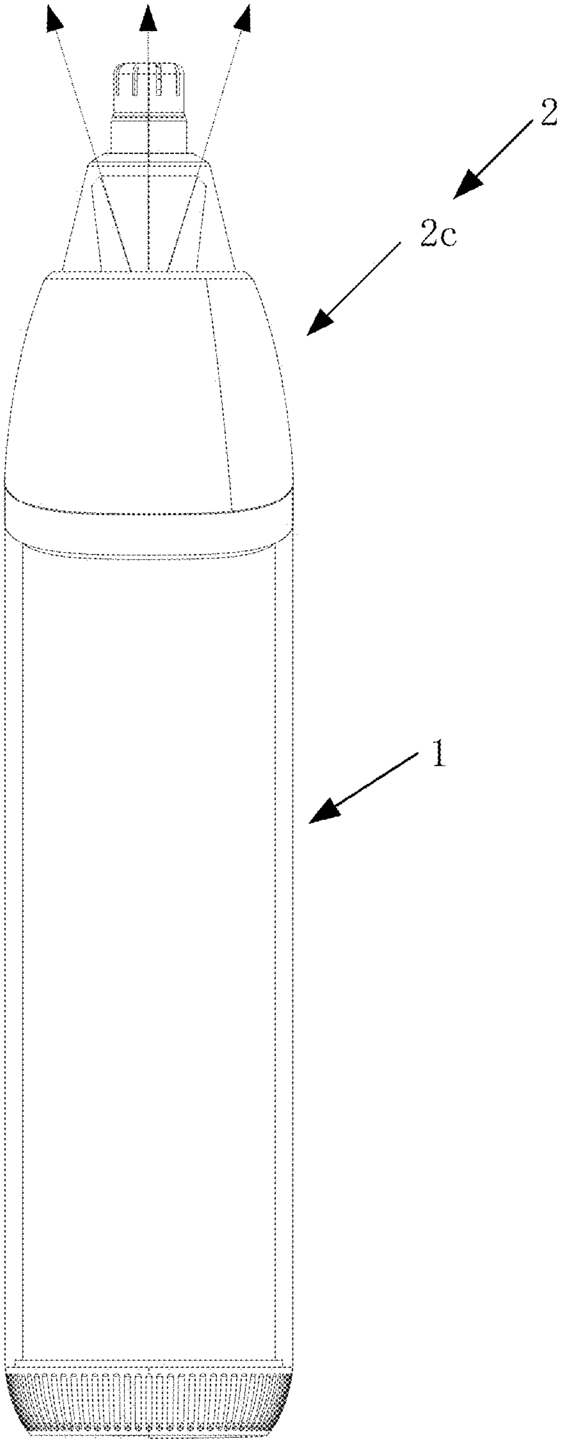
FIG. 14 is a schematic diagram of the electric hair trimmer according to a third embodiment of the present disclosure.
Figure 15:
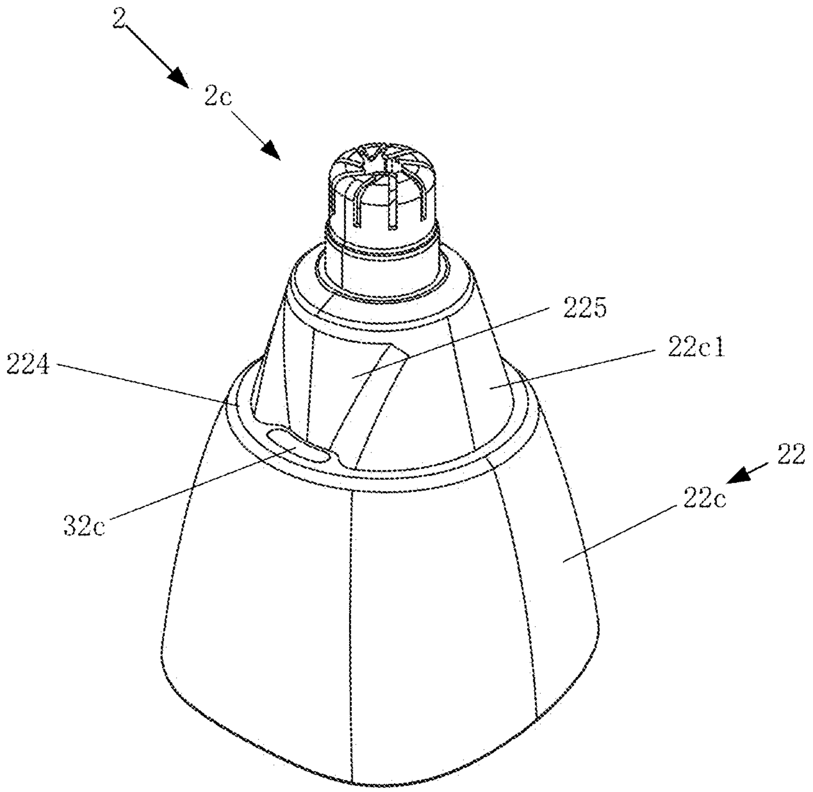
FIG. 15 is a schematic diagram of a nose hair trimmer head of the electric hair trimmer according to the third embodiment of the present disclosure.
Figure 16:
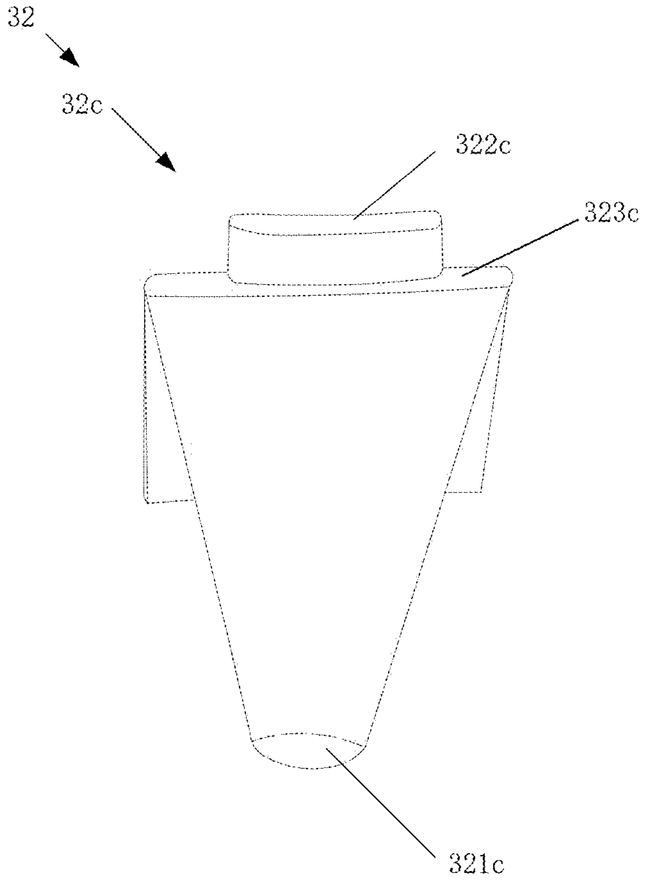
FIG. 16 is a schematic diagram of a trimming light guide body of the electric hair trimmer according to the third embodiment of the present disclosure.

As shown in FIGS. 14-16, the main difference between the embodiment 3 and the embodiment 1 is that the blade head 2 is a nose hair trimmer head **2*c*. The light guide body 32 is a trimming light guide body 32*c***.

The nose hair trimmer head **2*b* comprises a first trapezoidal cylindrical outer wall 22*c*. An upper end of the first trapezoidal cylindrical outer wall 22*c* of the nose hair trimmer head 2*b* is narrowed radially to form a second trapezoidal cylindrical outer wall 22*cl*. A bottom portion of the second trapezoidal cylindrical outer wall 22*cl* is connected to the upper end of the first trapezoidal cylindrical outer wall 22*c* of the nose hair trimmer head 2*b* to form an annular step surface 224. The light-emitting surface 322*c* of the trimming light guide body 32*c* and the annular step surface 224 of the nose hair trimmer head 2*b*** are located on a same plane.

In one embodiment, the light-receiving surface 321 of the trimming light guide body **32*c* is circular. A center of the light-receiving surface 321 of the trimming light guide body 32*c* is located on the output optical axis of the light source 31**.

The light-emitting surface **322*c* of the trimming light guide body 32*c* is in a kidney shape with a convex middle portion. A curvature of the light-emitting surface 322*c* of the trimming light guide body 32*c* is substantially consistent with a curvature of the annular step surface 224 of the nose hair trimmer head 2*b***.

An upper portion of the trimming light guide body **32*c*, close to the light-emitting surface 322*c* of the trimming light guide body, defines a kidney-shaped positioning flange 323*c* with a contour similar to the light-emitting surface 322*c*. An upper end surface of the kidney-shaped positioning flange 323*c* is in contact with a lower surface of the annular step surface 224 of the nose hair trimmer head 2*b***.

A light channel 225 is defined on a front side of the second trapezoidal cylindrical outer wall **22*cl* of the nose hair trimmer head 2*b*. The light channel 225 is inclined inward from the light-emitting surface 322*c* of the trimming light guide body 32*c*, and a top portion of the light channel 225** is open.

The light emitted from the light source passes through the lens and enters the light-receiving surface **321*c* of the nose hair trimming light guide 32*c* that is circular. The light is then transmitted through the trimming light guide body 32*c* to the light-emitting surface 322*c* that is kidney-shaped. The light is then projected upward along the light channel 225 to a nose hair trimming area. The light-emitting surface 322*c* of the nose hair trimming light guide 32*c* that is kidney-shaped expands an illumination range, while the kidney-shaped positioning flange 323*c*** ensures stability of the light path.

The illumination system of the present disclosure comprises the light source, the lens, and the light guide body, and the output optical axis of the light source is parallel to the output shaft of the motor, which achieves effective illumination of the working area of the electric hair trimmer.

The foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. An electric hair trimmer with an illumination system, comprising:

a handle;

a detachable and replaceable blade head; and the illumination system;

wherein the handle comprises a motor seat that is disposed on an output end of the handle, a motor is disposed in the motor seat, the detachable and replaceable blade head is detachably and quickly mountable on the motor seat of the handle, and the illumination system comprises portions that are separately disposed on the handle and the blade head;

wherein the illumination system comprises a light source and a light guide body, wherein the light source is disposed in the motor seat, an output optical axis of the light source is substantially parallel to an output shaft of the motor, wherein the light guide body is disposed on the blade head, wherein when the blade head with the light guide body is mounted onto the handle, a light-receiving surface of the light guide body is disposed corresponding to the output optical axis of the light source, and a light-emitting surface of the light guide body faces a working area of the blade head;

wherein the light guide body is an integral part of the blade head and is replaced together with the blade head when the blade head is replaced.

2. The electric hair trimmer according to claim 1, wherein the light guide body extends upward from the light-receiving surface thereof to the light-emitting surface thereof along an inner side of a front surface of an outer wall of the blade head.

3. The electric hair trimmer according to claim 2, wherein a lens of the illumination system is mounted in the motor seat and is disposed on the light source, a top surface of the lens is substantially parallel to a top surface of the motor seat, and light emitted by the light source is concentrated by the lens and transmitted upward to the light-receiving surface of the light guide body.

4. The electric hair trimmer according to claim 3, wherein the output optical axis of the light source passes through a middle portion of the light-receiving surface of the light guide body, and the light-receiving surface of the light guide body is symmetrically disposed with respect to the output optical axis of the light source.

5. The electric hair trimmer according to claim 4, wherein the light-emitting surface of the light guide body extends laterally along the outer wall of the blade head.

6. The electric hair trimmer according to claim 5, wherein the output shaft of the motor extends out from the motor seat, a top end of the output shaft of the motor exceeds the top surface of the motor seat, and the output shaft of the motor is configured to output a driving force of the motor upward to an input end of the blade head.

7. The electric hair trimmer according to claim 6, wherein an annular stepped groove is defined on an inner side of an upper edge of a peripheral wall of the motor seat, an annular stepped rim is disposed on an inner side of a lower edge of an outer wall of the blade head, and when the upper edge of the peripheral wall of the motor seat is docked with the lower edge of the outer wall of the blade head, the annular stepped rim is clamped in the annular stepped groove.

8. The electric hair trimmer according to claim 7, wherein the top surface of the motor seat is substantially perpendicular to the output shaft of the motor, an included angle formed between a top surface of the upper edge of the peripheral wall of the motor seat and the top surface of the motor seat is within 10-25 degrees, and an included angle formed between a top surface of the lower edge of the outer wall of the blade head and the top surface of the motor seat is within 10-25 degrees.

9. The electric hair trimmer according to claim 8, wherein the output optical axis of the light source and an axis of the lens are located between an inner side of a front side of the peripheral wall of the motor seat and the motor.

10. The electric hair trimmer according to claim 9, wherein the blade head is a shaver head, the light guide body is a shaving light guide body, and an upper light-emitting surface of the shaving light guide body and a top surface of the outer wall of the shaver head are located on a same plane.

11. The electric hair trimmer according to claim 10, wherein in an extending direction from the light-receiving surface to the upper light-emitting surface of the shaving light guide body, cross-sectional areas of the shaving light guide body gradually increase, and an area of the upper light-emitting surface of the shaving light guide body is about 1.5-4 times an area of the light-receiving surface of the shaving light guide body.

12. The electric hair trimmer according to claim 11, wherein a notch is defined at a horizontal top end of the front surface of the outer wall of the shaver head, the shaving light guide body comprises a front light-emitting surface consistent with an outer surface of the outer wall of the shaver head, and the front light-emitting surface of the shaving light guide body is close to an upper portion of the upper light-emitting surface of the shaving light guide body and extends outward along the notch.

13. The electric hair trimmer according to claim 12, wherein the front light-emitting surface of the shaving light guide body is substantially perpendicular to the upper light-emitting surface of the shaving light guide body.

14. The electric hair trimmer according to claim 9, wherein the blade head is a hair clipper head, and the light guide body is a clipping light guide body, an upper middle portion of a front surface of the outer wall of the hair clipper head is recessed downward to form a U-shaped structure, and an opening of the U-shaped structure faces upward to correspond to a trimming blade of the hair clipper head;

wherein the light-emitting surface of the clipping light guide body is substantially flush with an upper surface of a bottom wall of the U-shaped structure, and a width of the light-emitting surface of the clipping light guide body is slightly greater than half a width of the trimming blade.

15. The electric hair trimmer according to claim 14, wherein the light-emitting surface of the clipping light guide body is a concave arc-shaped surface, and the light-emitting surface of the clipping light guide body is connected to the outer wall of the hair clipper head that is recessed inward.

16. The electric hair trimmer according to claim 9, wherein the blade head is a nose hair trimmer head, and the light guide body is a trimming light guide body;

wherein the nose hair trimmer head comprises a first trapezoidal cylindrical outer wall, an upper end of the first trapezoidal cylindrical outer wall of the nose hair trimmer head is narrowed radially to form a second trapezoidal cylindrical outer wall, and a bottom portion of the second trapezoidal cylindrical outer wall is connected to the upper end of the first trapezoidal cylindrical outer wall of the nose hair trimmer head to form an annular step surface;

wherein the light-emitting surface of the trimming light guide body and the annular step surface of the nose hair trimmer head are located on a same plane.

17. The electric hair trimmer according to claim 16, wherein the light-receiving surface of the trimming light guide body is circular, and a center of the light-receiving surface of the trimming light guide body is located on the output optical axis of the light source.

18. The electric hair trimmer according to claim 17, wherein the light-emitting surface of the trimming light guide body is in a kidney shape with a convex middle portion, and a curvature of the light-emitting surface of the trimming light guide body is substantially consistent with a curvature of the annular step surface of the nose hair trimmer head.

19. The electric hair trimmer according to claim 18, wherein an upper portion of the trimming light guide body, close to the light-emitting surface of the trimming light guide body, defines a kidney-shaped positioning flange with a contour similar to the light-emitting surface; wherein an upper end surface of the kidney-shaped positioning flange is in contact with a lower surface of the annular step surface of the nose hair trimmer head.

20. An electric hair trimmer with an illumination system, comprising:

a handle;

a detachable and replaceable blade head; and the illumination system;

wherein the handle comprises a motor seat that is disposed on an output end of the handle, a motor is disposed in the motor seat, the detachable and replaceable blade head is detachably and quickly mountable on the motor seat of the handle, and the illumination system comprises portions that are separately disposed on the handle and the blade head;

wherein the illumination system comprises a light source and a light guide body, wherein the light source is disposed in the motor seat, an output optical axis of the light source is substantially parallel to an output shaft of the motor, wherein the light guide body is disposed on the blade head, wherein when the blade head with the light guide body is mounted onto the handle, a light-receiving surface of the light guide body is disposed corresponding to the output optical axis of the light source, and a light-emitting surface of the light guide body faces a working area of the blade head;

wherein there is defined an annular stepped groove on an inner side of an upper edge of a peripheral wall of the motor seat, and there is defined an annular stepped rim on an inner side of a lower edge of an outer wall of the blade, and wherein when the upper edge of the peripheral wall of the motor seat is docked with the lower edge of the outer wall of the blade head, the annular stepped rim is clamped in the annular stepped groove.

* * * * *